United States Patent
Bin Mohd Razha et al.

(10) Patent No.: US 8,443,327 B2
(45) Date of Patent: May 14, 2013

(54) REASSEMBLING SCATTERED LOGIC BLOCKS IN INTEGRATED CIRCUITS

(75) Inventors: Mohd Mawardi Bin Mohd Razha, Bayan Lepas (MY); Jinyong Yuan, Cupertino, CA (US)

(73) Assignee: Altera Corporation, San Jose, CA (US)

( * ) Notice: Subject to any disclaimer, the term of this patent is extended or adjusted under 35 U.S.C. 154(b) by 92 days.

(21) Appl. No.: 13/031,801

(22) Filed: Feb. 22, 2011

(65) Prior Publication Data

US 2012/0216165 A1    Aug. 23, 2012

(51) Int. Cl.
*G06F 17/50* (2006.01)
(52) U.S. Cl.
USPC ........................................................ 716/132
(58) Field of Classification Search .............. 716/100, 716/132
See application file for complete search history.

(56) References Cited

U.S. PATENT DOCUMENTS

| | | |
|---|---|---|
| 2006/0033527 A1* | 2/2006 | Lee et al. ............... 326/41 |
| 2007/0083845 A1* | 4/2007 | Koga et al. ............. 716/18 |

* cited by examiner

*Primary Examiner* — Suchin Parihar
(74) *Attorney, Agent, or Firm* — Womble Carlyle Sandridge & Rice, LLP

(57) ABSTRACT

Techniques for reassembling scattered logic blocks in an integrated circuit (IC) are provided. The techniques include identifying a virtual memory block to be reassembled in an IC design. The virtual memory block is formed by a plurality of memory blocks that are connected by a plurality of logic circuitry. The plurality of memory blocks and the plurality logic circuitry that connect the memory blocks within the virtual memory block are identified. The identified logic circuitry and memory blocks are removed from the virtual memory block. The virtual memory block is replaced with a custom memory block that is functionally comparable to the plurality of connected memory blocks in the virtual memory block.

21 Claims, 9 Drawing Sheets

REASSEMBLING SCATTERED LOGIC BLOCKS IN INTEGRATED CIRCUITS

BACKGROUND

Programmable logic devices (PLDs) such as field-programmable gate arrays (FPGAs) and application-specific integrated circuits (ASICs) are integrated circuits (ICs) devices that include generic structures and logic blocks that can be configured to perform different functions. Some of these logic blocks include logic circuitry, registers, I/O blocks, memory blocks, digital signal processing (DSP) blocks, one-time programmable (OTP) fuse blocks, etc. These circuitry elements are programmable to perform any of a variety of tasks and functions.

Generally speaking, these circuitry elements, e.g., memory blocks, may be placed anywhere on the IC device. However, the placement of some of these circuitry elements may depend on the type of the IC device and the design placed on the IC device. For instance, an IC design implemented on an FPGA device with a specific set of circuitry elements will be routed differently when implemented on an ASIC device with a different set of circuitry elements.

Generally speaking, even though an IC design may be implemented on different devices, the design may require specific resources that may not be available on all the IC devices. This is especially true when an IC design that requires a big block of memory is implemented on an IC device that only includes multiple fragmented smaller blocks of memory. Although the smaller blocks of memory on the IC device may still be adequate for the design, the scattered placement of such memory blocks on the device may take up more space on the IC device compared to a centralized memory block. It may also be more complicated to route the IC design on a device with fragmented memory blocks.

SUMMARY

Exemplary embodiments include techniques for reassembling logic blocks on an integrated circuit (IC).

It should be appreciated that the exemplary embodiments can be implemented in numerous ways, such as a process an apparatus, a system, a device or a method on a computer readable medium. Several exemplary embodiments are described below.

In one embodiment, a method of reassembling memory blocks in an IC is provided. The method includes identifying a virtual memory block in a first IC design that needs to be reassembled. A plurality of logic circuitry and a plurality of memory blocks within the virtual memory block are identified. The plurality of memory blocks within the virtual memory block is connected through the plurality of logic circuitry. The plurality of logic circuitry and the plurality of memory blocks that form the virtual memory block in the first IC design are removed. The virtual memory block is then replaced with a custom memory block to generate a second IC design. The custom memory block is functionally comparable to the plurality of connected memory blocks within the virtual memory block in the first IC design.

In another embodiment, a method for optimizing an IC design is disclosed. The method includes generating a first netlist for the IC design and identifying a plurality of logic blocks in the first netlist that are connectable with a plurality of logic circuitry to form a larger logic block. A marker is placed around a boundary of the plurality of logic blocks. The plurality of logic circuitry is removed based on the marking. The plurality of logic blocks is then replaced with a larger logic block that has the same number of input and output terminals as the combined number of the input and output terminals of all of the plurality of logic blocks.

In yet another embodiment, a machine-readable storage medium encoded with sequences of instructions for compiling an IC design is disclosed. The machine-readable medium has instructions for identifying a logic block in a first IC design that is a non-existent logic block in a second IC design. The machine-readable medium also includes instructions for generating a first netlist based on the IC design and identifying a plurality of scattered memory blocks in the IC design. At least a portion of the plurality of scattered memory blocks is selected to be reassembled into a larger memory block. The selected portion of the scattered memory blocks to be reassembled is marked. A plurality of logic circuitry that connects each of the portion of the plurality of marked memory blocks is then removed. The marked memory blocks are replaced with a larger and functionally equivalent memory block. A second netlist is generated for the IC design and the first netlist is compared with the second netlist to ensure that the functionality of the first netlist is preserved in the second netlist.

Other aspects of the exemplary embodiments will become apparent from the following detailed description, taken in conjunction with the accompanying drawings, illustrating by way of example the principles of the exemplary embodiments.

BRIEF DESCRIPTION OF THE DRAWINGS

The exemplary embodiments may best be understood by reference to the following description taken in conjunction with the accompanying drawings.

DETAILED DESCRIPTION

The following embodiments describe techniques for reassembling logic blocks on an integrated circuit (IC).

It is appreciated that the embodiments may be practiced without some or all of these specific details. In other instances, operations have not been described in detail in order not to unnecessarily obscure the exemplary embodiment.

The embodiments described herein provide techniques to reassemble logic blocks within an IC design. For instance, an IC design with fragmented memory blocks may be reassembled so that the fragmented memory blocks are grouped together as a single memory block. Reassembling of fragmented memory blocks is useful in an IC design to be implemented on the device that has memory blocks that are substantially smaller in size compared to the one needed.

In one of the embodiments, the multiple memory blocks, or other logic blocks are grouped together to form a single memory block. Generally, the single memory block takes up less space on the IC device compared to the scattered placement of the smaller memory blocks. In other words, the grouped logic blocks form a single logic block that meets the specific requirements of a particular IC design. The technique allows logic blocks to be rearranged without affecting the functionality of the IC design. Rearranging logic blocks based on the requirements of an IC design also significantly reduces the routing complexity in the IC design. Therefore, it is desirable to have a mechanism or technique to reassemble logic blocks, or in this case, memory blocks, on an IC device as required by the design implemented on the IC device. As such, an IC design implemented on a particular device can be easily migrated to and optimized for another device without being restricted to the types of resources available on the two devices.

Figure 1:
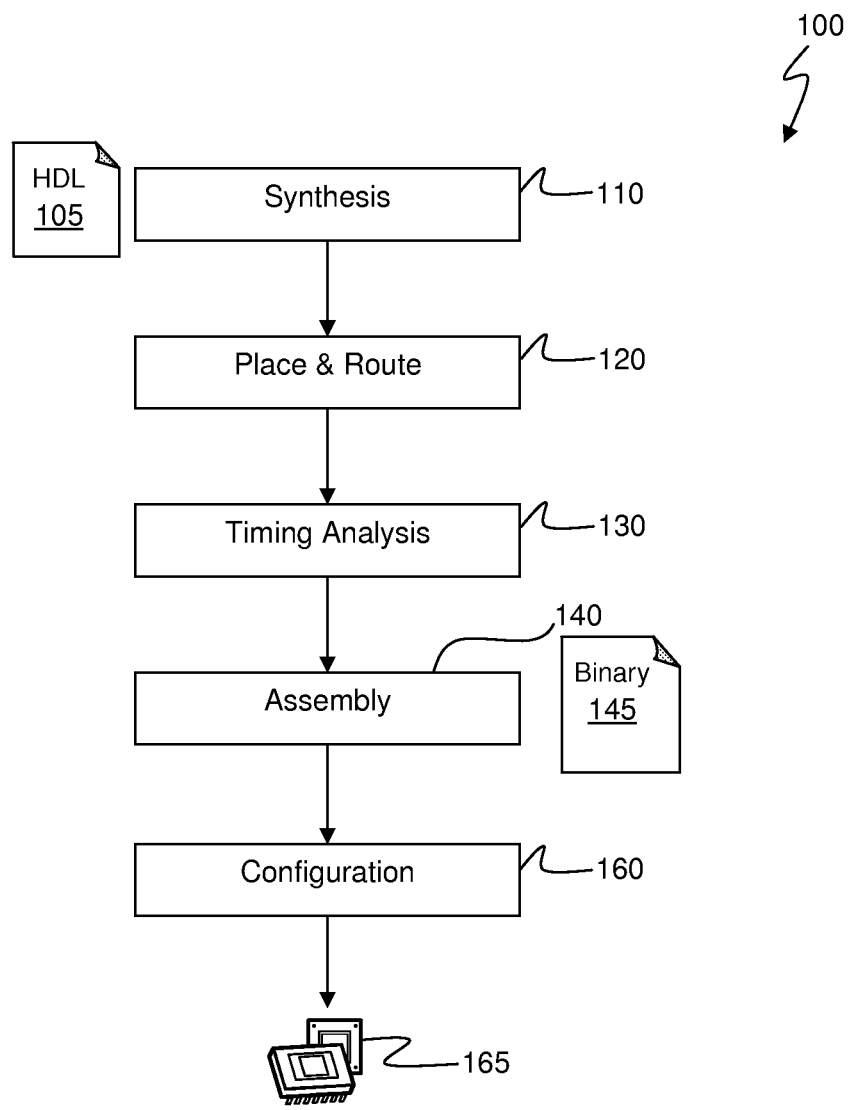
FIG. 1 shows an exemplary compilation flow to create a compiled design for an IC using an electronic design automation (EDA) tool in accordance with one embodiment.

FIG. 1, meant to be illustrative and not limiting, shows exemplary compilation flow 100 to create a compiled design for an IC using an electronic design automation (EDA) tool, in accordance with one embodiment. The flow starts with an IC design created by a circuit developer or a hardware engineer that may be embodied in a hardware description language (HDL) file 105. The IC design embodied in the HDL file is synthesized and translated into a discrete netlist of logic-gate primitives during synthesis operation 110. The synthesized logic gates and other components in the IC design are placed on the IC device during place and route operation 120. Wires are also added to connect the logic gates and all the other components in the IC to route signals in the IC design during place and route operation 120.

Referring still to FIG. 1, after place and route operation 120, timing analysis operation 130 assigns delays to the different logic gates and wires or routes in the circuit. Timing analysis operation 130 computes the lengths of different paths in the IC design and the timing constraints of the IC design, in one embodiment. Binary configuration file 145 may be created during assembly operation 140. In one embodiment, binary configuration file 145 contains a description of the circuit of the IC design and is used to configure IC device 165 with the IC design during configuration operation 160. It is appreciated that one or more operations shown in flow 100 may optional. In other words, certain operations may be skipped if desired without stopping the EDA tool from reaching a solution. However, the quality of the resulting IC design solution may be impacted by the removal of the optional operations.

Figure 2:
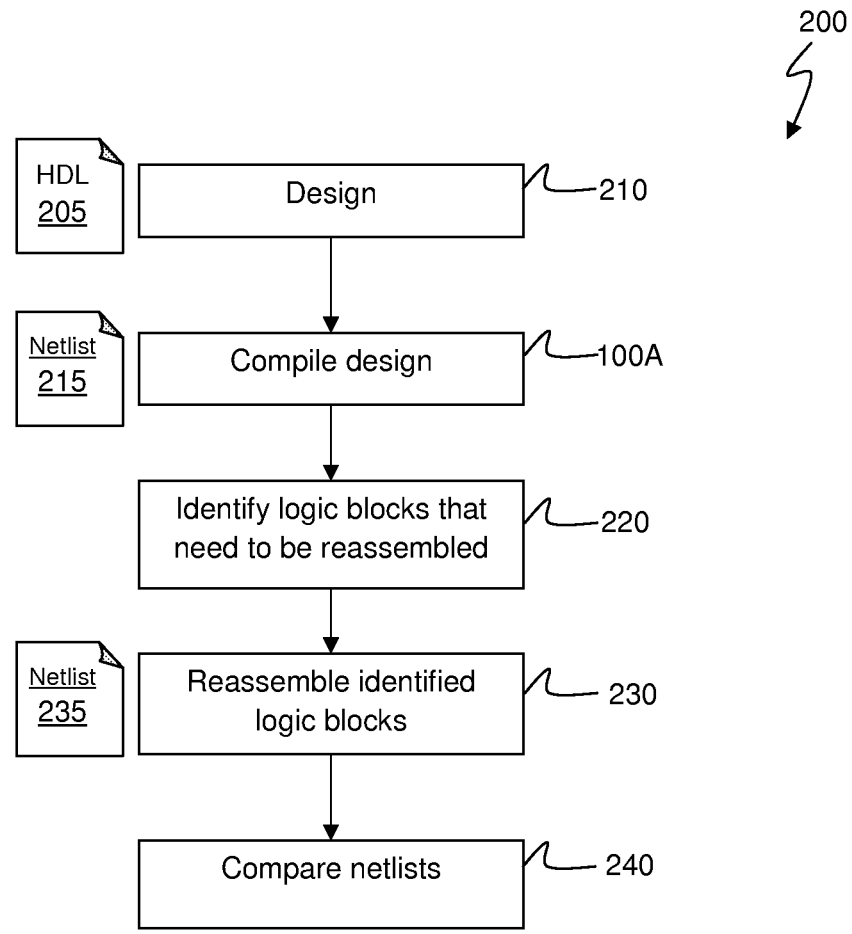
FIG. 2 shows an exemplary a process flow for compiling an IC design for a particular IC device and optimizing the IC design by reassembling some of the logic blocks in accordance with another embodiment.

FIG. 2 shows exemplary process flow 200 for compiling an IC design for a particular IC device and optimizing the IC design by reassembling some of the logic blocks in accordance with another embodiment. Flow 200 begins with design operation 210. During design operation 210, a user, e.g., a circuit designer, creates an IC design described in hardware description language (HDL) file 205. The IC design is compiled in operation 100A and a discrete netlist 215 is generated for the IC design. Compile operation 100A is similar to compilation flow 100 as shown in FIG. 1. At this point, the compiled IC design can be used to configure an IC device, e.g., a field-programmable gate array (FPGA) device or a structured application specific integrated circuit (ASIC) device. After the IC design has been fully compiled, the netlist of the IC design is processed in operation 220 to identify the logic blocks that need to be reassembled.

Referring still to FIG. 2, based on the information gathered in operation 220, the affected logic blocks are reassembled in operation 230. In one embodiment, the logic blocks may be random access memory (RAM) blocks that may be spaced apart from each other by a specified minimum distance and may be reassembled to form a single RAM block that will meet the requirements of the IC design. A modified netlist 235 based on the reassembling process is also generated in operation 230. In operation 240, the modified netlist 235 is compared with netlist 215 as part of a verification process. In one embodiment, the verification process is an equivalency check that verifies that the modified netlist with the reassembled logic blocks retains the intended behavior of the original design.

Figure 3:
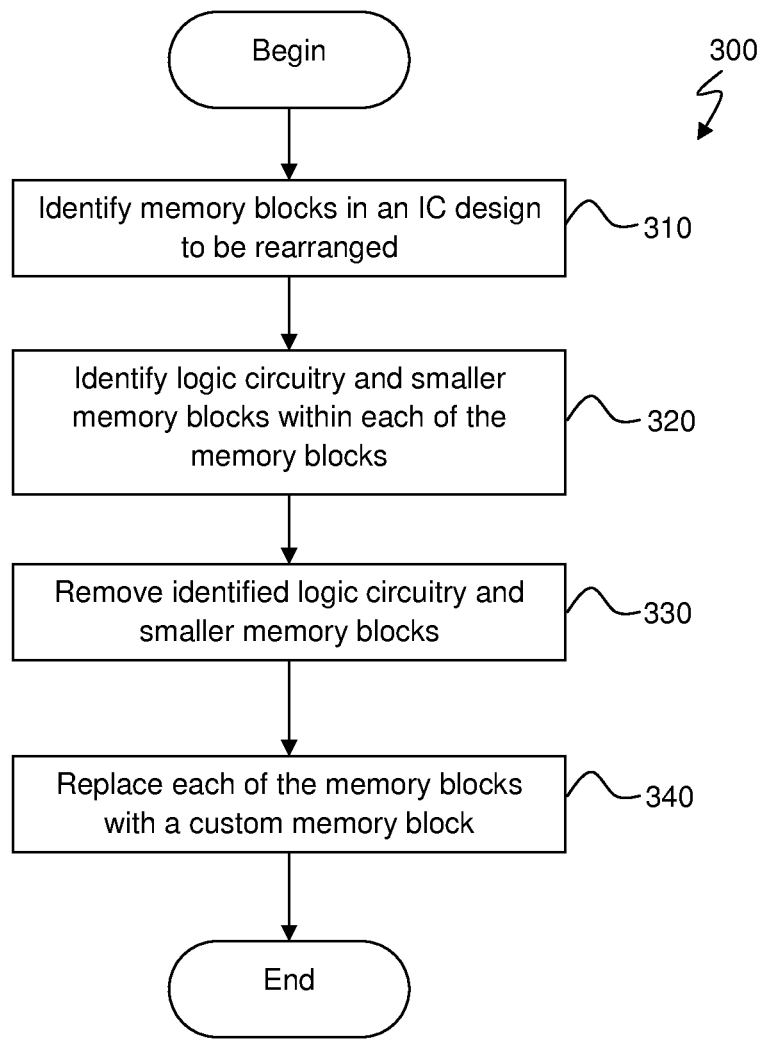
FIG. 3 shows an exemplary process flow for reassembling logic blocks in an IC design in accordance with yet another embodiment.

FIG. 3 shows exemplary process flow 300 for reassembling logic blocks in an IC design in accordance with yet another embodiment. In one embodiment, process flow 300 is performed as part of operations 220 and 230 of process flow 200 shown in FIG. 2. Process flow 300 begins with identifying a virtual memory block to be rearranged in an IC design in operation 310. According to one embodiment, the virtual memory block may be formed by multiple memory blocks that are "stitched" together with additional logic circuitry (logic gates, decoders, multiplexers, etc.), to form a memory block.

According to another embodiment, the virtual memory block to be rearranged is identified based on either the total number of memory bits required in the IC design, the placement locations of the memory blocks that form the virtual memory block, the type of memory required in the IC design, or a combination of these criteria. For instance, the IC design may be implemented on an IC device and virtual memory blocks formed by memory blocks that are placed relatively far apart from each other on the IC device are reassembled as a single memory block.

Referring still to FIG. 3, a plurality of logic circuitry and a plurality of memory blocks within the virtual memory block are identified in operation 320. The logic circuitry and memory blocks that form the identified virtual memory block are removed from the virtual memory block in operation 330. After the removal operation, the virtual memory block is replaced with a custom memory block to generate another IC design in operation 340.

In one embodiment, the custom memory block is functionally comparable to the virtual memory block that it replaces, as well as the plurality of memory blocks defining the virtual memory block. As used herein, functionally comparable or functionally equivalent refers to one embodiment where the number of inputs and outputs of the virtual memory block or the plurality of memory blocks defining the virtual memory block is equal to the number of input and output ports of the custom memory block. In another embodiment, the original IC design is an FPGA design and the IC design generated in operation 340 is a structured ASIC design. Both of the IC designs may be compared to ensure that the functionality of the original IC design is preserved in the modified IC design.

Figure 4A:
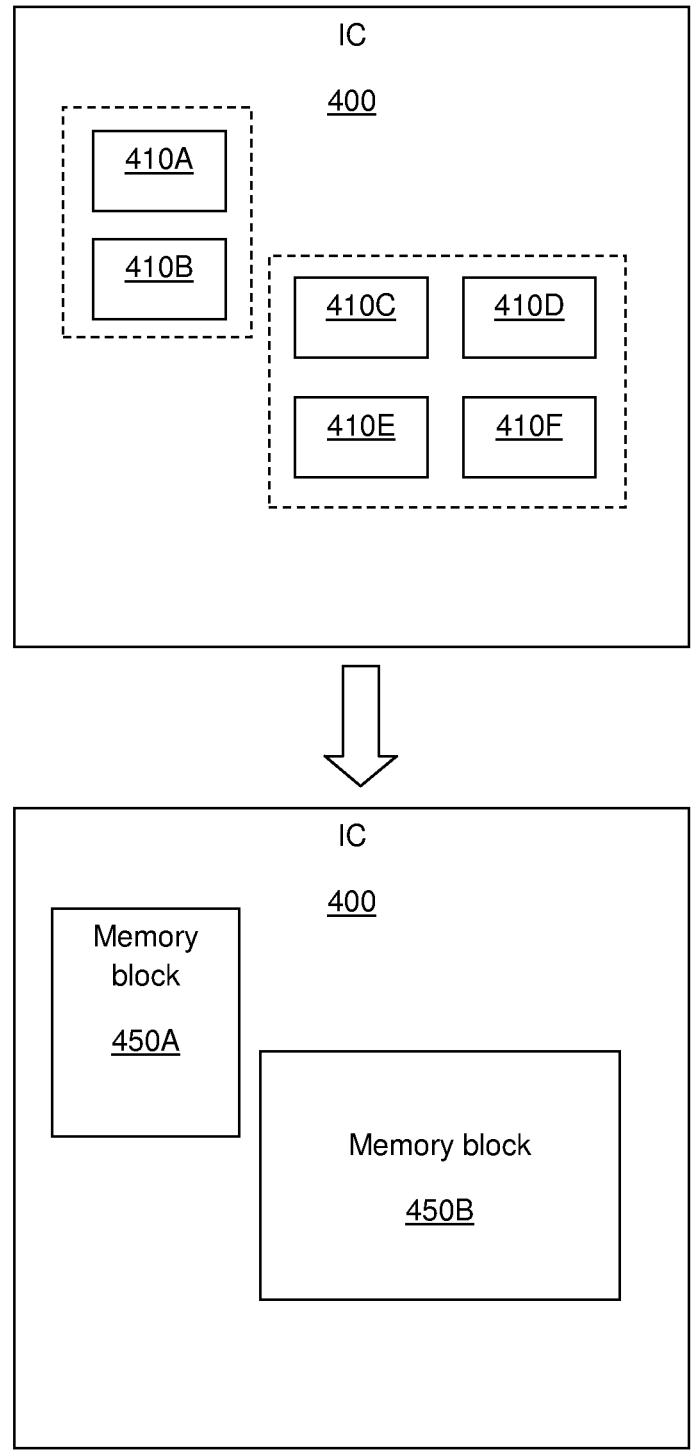
FIG. 4A shows an exemplary block diagram of an IC device with six logic blocks grouped to form two larger logic blocks in accordance with one embodiment of the present invention.

FIG. 4A shows an exemplary simplified block diagram of IC device 400 with logic blocks 410A-410F that can be grouped together to form larger logic blocks 450A and 450B in accordance with one embodiment of the present invention. In the embodiment of FIG. 4A, six logic blocks 410A-410F are shown. In the embodiment of FIG. 4A, logic blocks 410A and 410B are grouped together to form a virtual logic block that is replaced with custom logic block 450A and logic blocks 410C, 410D, 410E and 410F are grouped together to form another virtual logic block that is replaced with custom logic block 450B. Even though only a few logic blocks are shown in FIG. 4A, it is appreciated that more logic blocks may be available on an IC device.

Figure 4B:
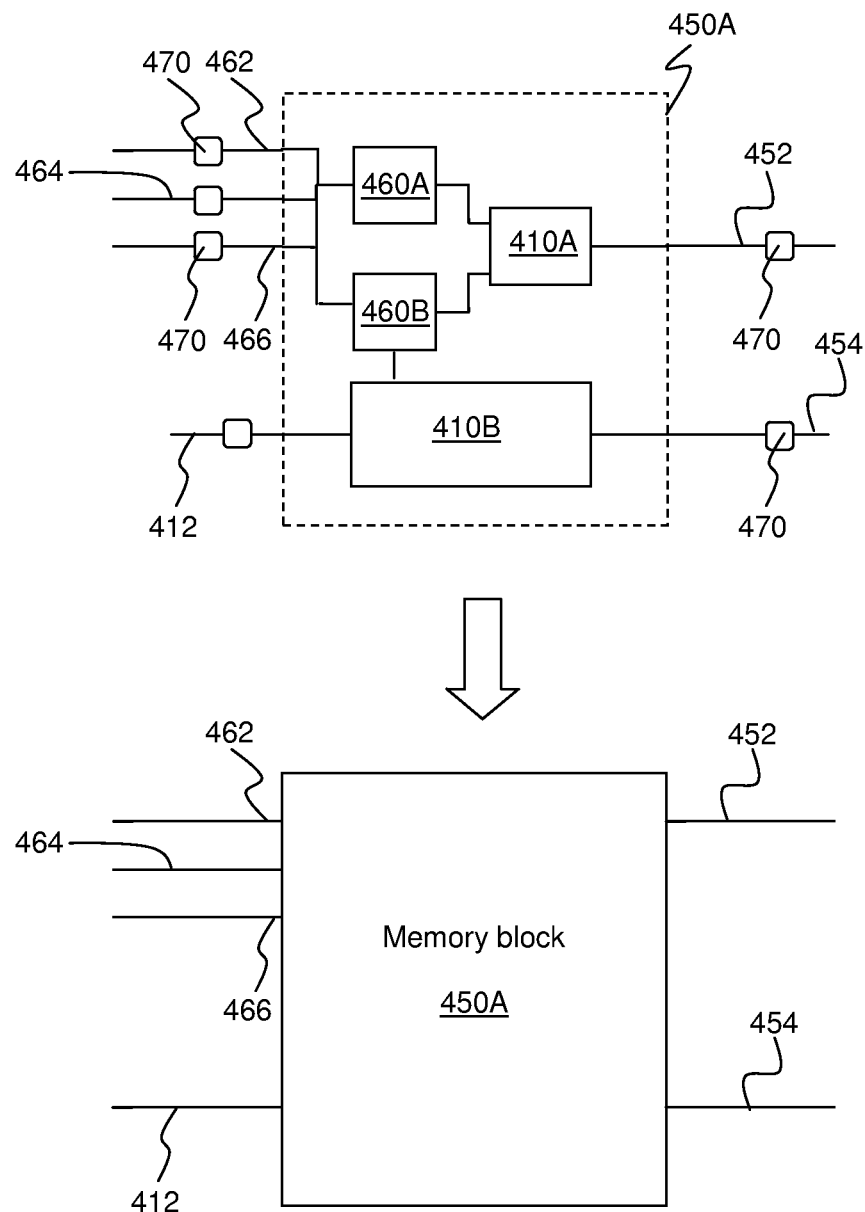
FIG. 4B shows exemplary logic blocks forming a larger logic block in accordance with one embodiment of the present invention.

FIG. 4B shows exemplary logic blocks 410A and 410B forming a larger logic block in accordance with one embodiment of the present invention. According to one embodiment, logic blocks 410A and 410B are RAM blocks that are connected together by logic circuitry 460A and 460B to form a virtual RAM block, represented by the dotted line box in FIG. 4B, with four input terminals, i.e., inputs 412, 462, 464 and 466, and two output terminals, i.e. outputs 452 and 454. Logic circuitry 460A and 460B may include, among others, logic gates, decoders, multiplexers, etc., that are used to connect logic blocks 410A and 410B together.

Referring still to FIG. 4B, logic blocks 410A and 410B, together with logic circuitry 460A and 460B, are marked for removal. According to the embodiment of FIG. 3, logic blocks 410A and 410B and logic circuitry 460A and 460B are identified in operation 320 in process flow 300. Markers 470 are placed at the boundary of the virtual logic block. In the embodiment of FIG. 4B, markers 470 are placed at every input and output terminals of the virtual logic block. It should be appreciated that markers 470 may include, among other things, buffers and other relatively simple logic circuitry that can be easily placed at the boundary of a logic block. The markers are placed such that every input and output terminals is retained even when the logic blocks 410A and 410B and the logic circuitry 460A and 460B are removed and replaced with a custom logic block 450A. It should be appreciated that a similar concept is equally applicable to logic blocks 410C, 410D, 410E and 410F and for the sake of brevity, is not repeated in detail here.

Figure 5:
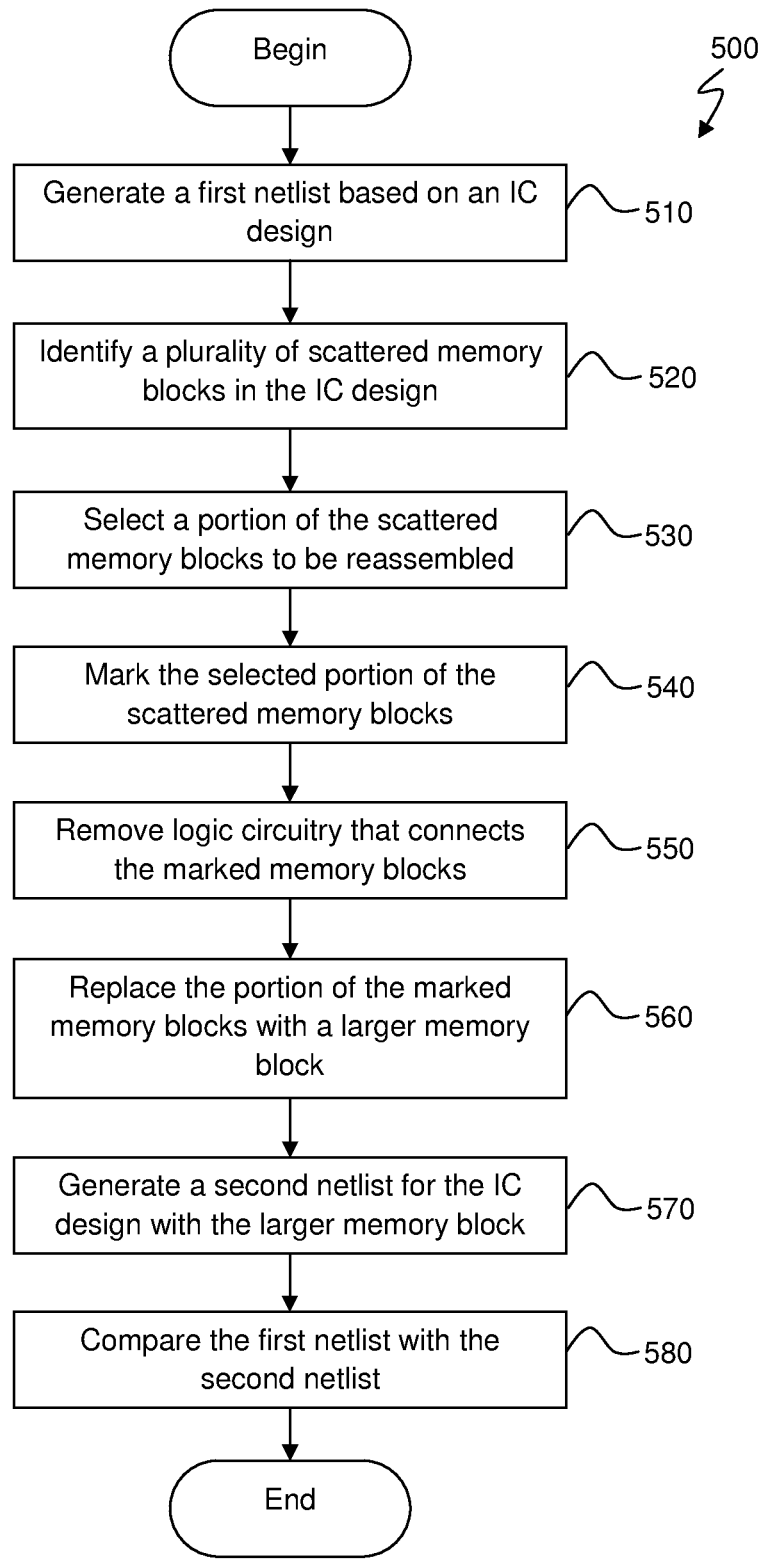
FIG. 5, shows an exemplary process flow for compiling and optimizing an IC design as one embodiment in accordance with the present invention.

FIG. 5 shows exemplary process flow 500 for compiling and optimizing an IC design as one embodiment in accordance with the present invention. Process flow 500 begins by generating a first netlist based on the IC design in operation 510. In one embodiment, the netlist is generated during a synthesis process similar to that in operation 110 of process flow 100 shown in FIG. 1. From the first netlist, a plurality of scattered memory blocks in the IC design that are connectable to form a larger memory block is identified in operation 520. A portion of the scattered memory blocks is selected in operation 530 to be reassembled into a larger memory block.

Continuing from FIG. 5, the selected memory blocks are marked in operation 540. In one embodiment, markers are placed around the boundary of the selected memory blocks. For instance, buffers can be placed at all input and output terminals of the plurality of scattered memory blocks similar to buffers 470 as shown in the embodiment of FIG. 4B. A plurality of logic circuitry that connects the marked memory blocks may then be removed in operation 550. The removed logic circuitry may include, among others, logic gates, decoders, multiplexers and even other memory blocks. In illustrative example of FIG. 4B, the logic circuitry within the memory block include two memory blocks 410A and 410B that are connected together by two logic circuitry 460A and 460B.

Referring still to FIG. 5, the memory blocks that have been identified and marked in operation 540 are replaced with a functionally equivalent memory block in operation 560. The functionally equivalent memory block is a custom memory block that meets the requirement of the IC design. In an exemplary embodiment, the IC design may be implemented on a device that does not meet requirements of the IC design. For instance, the memory resources on the device may not meet the memory requirements of the IC design and scattered memory blocks on the device may be "stitched" or connected together to form a larger memory block that meets the specific requirements of the particular IC design.

Generally, the custom memory block is a larger memory block that is created based on the specific requirements of the IC design to replace the smaller scattered memory blocks that are available on the device. Even though these smaller memory blocks may be connectable to form larger memory blocks as necessary, it is usually cumbersome to connect and route all these memory blocks. Moreover, the fragmented memory blocks may take up more space on the resulting IC device in comparison to a single larger memory block.

Referring still to FIG. 5, a second netlist is generated in operation 570 for the modified IC design with the custom memory block. The second netlist is then compared with the first netlist in operation 580 to ensure that the functionality of the first netlist is preserved in the modified design. In one embodiment, the functionality of the first netlist is preserved if the custom memory block that replaces the marked memory blocks in operation 560 retains the total number of bits and the mode of operation, e.g., single or dual port mode, etc., of the marked memory blocks. In another embodiment, the number of input and output terminals in the second netlist matches the number of input and output terminals in the first netlist. In an exemplary embodiment, the first netlist is implemented on a first type of PLD, e.g., an FPGA device, and the second netlist is implemented on a second type of PLD, e.g., an ASIC device, that is generally smaller in size compared to the first type of PLD.

Figure 6:
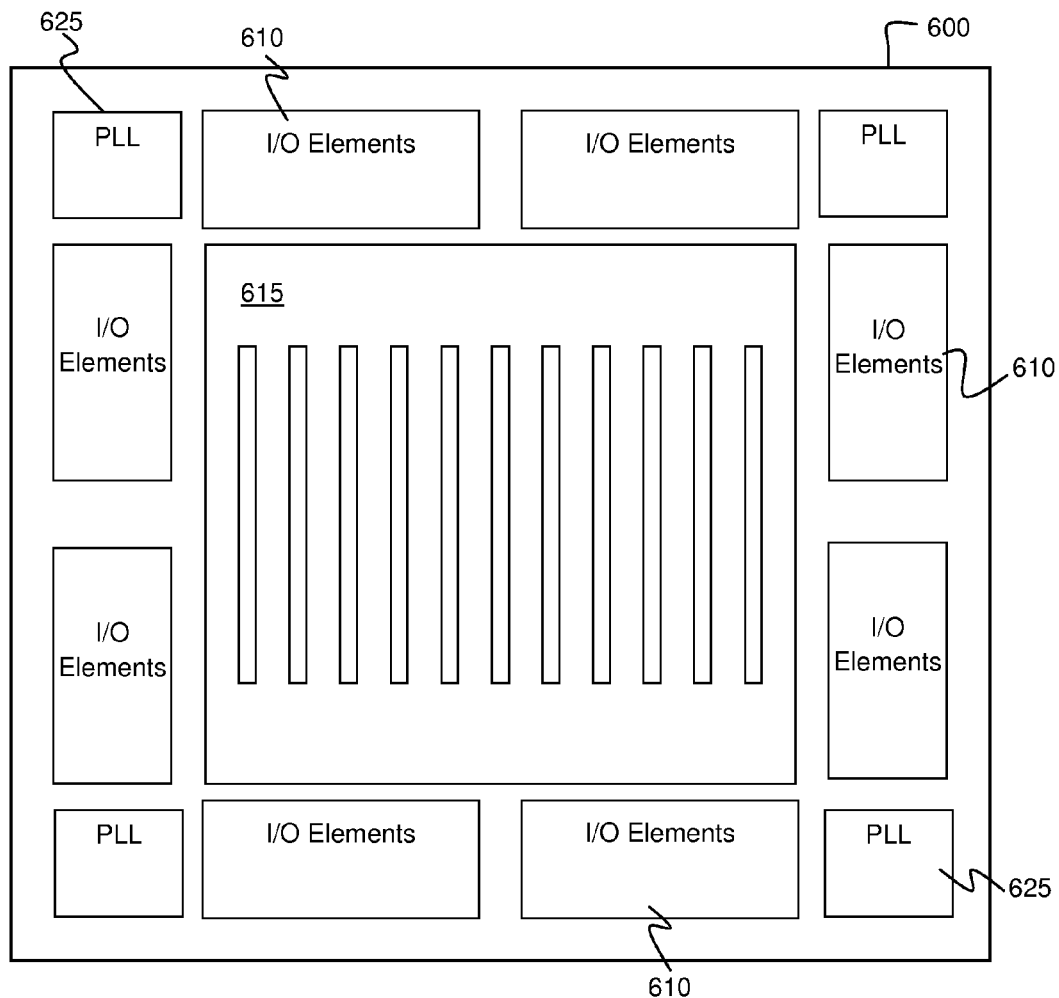
FIG. 6 shows an exemplary block diagram of a programmable logic device (PLD) in accordance with one embodiment of the present invention.

FIG. 6 shows an exemplary block diagram of PLD 600 in accordance with one embodiment of the present invention. Programmable device 600 includes logic region 615 and I/O elements 610. I/O elements 610 may support a variety of memory interfaces. Other auxiliary circuits such as phase-locked loops (PLLs) 625 for clock generation and timing, can be located outside the core logic region 615, e.g., at corners of programmable device 600 and adjacent to I/O elements 610. Logic region 615 may be populated with logic cells which include, among other things "logic elements" (LEs). LEs may include look-up table-based logic regions and these logic elements may be grouped into "Logic Array Blocks" (LABs). The logic elements and groups of logic elements or LABs can be configured to perform logical functions desired by the user. Logic region 615 may also include logic circuitry and RAM blocks that can be rearranged similar to logic blocks 410A-410F in FIGS. 4A and 4B.

Figure 7:
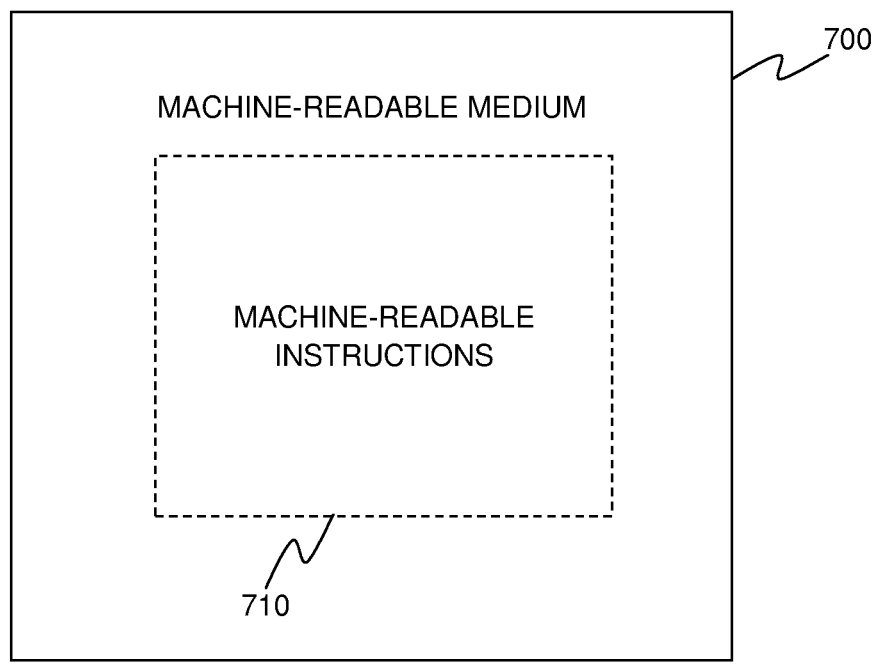
FIG. 7 is an exemplary block diagram of a machine-readable medium encoded with machine-readable instructions in accordance with an embodiment of the present invention.

The embodiments described herein can also be embodied as machine-readable instructions 710 on machine-readable storage medium 700 as shown in FIG. 7. Machine-readable storage medium 700 is any data storage device that can store data, which can thereafter be read by a machine or a computer system. Illustrative examples of machine-readable storage medium 700 include hard drives, network attached storage (NAS), read-only memory, random-access memory, CDs, DVDs, USB drives, volatile and non-volatile memory, and other optical and non-optical data storage devices. Machine-readable storage medium 700 can also be distributed over a network-coupled computer system so that machine-readable instructions 710 are stored and executed in a distributed fashion. Machine-readable instructions 710 can perform any or all of the operations illustrated in FIGS. 1, 2, 3 and 5.

Figure 8:
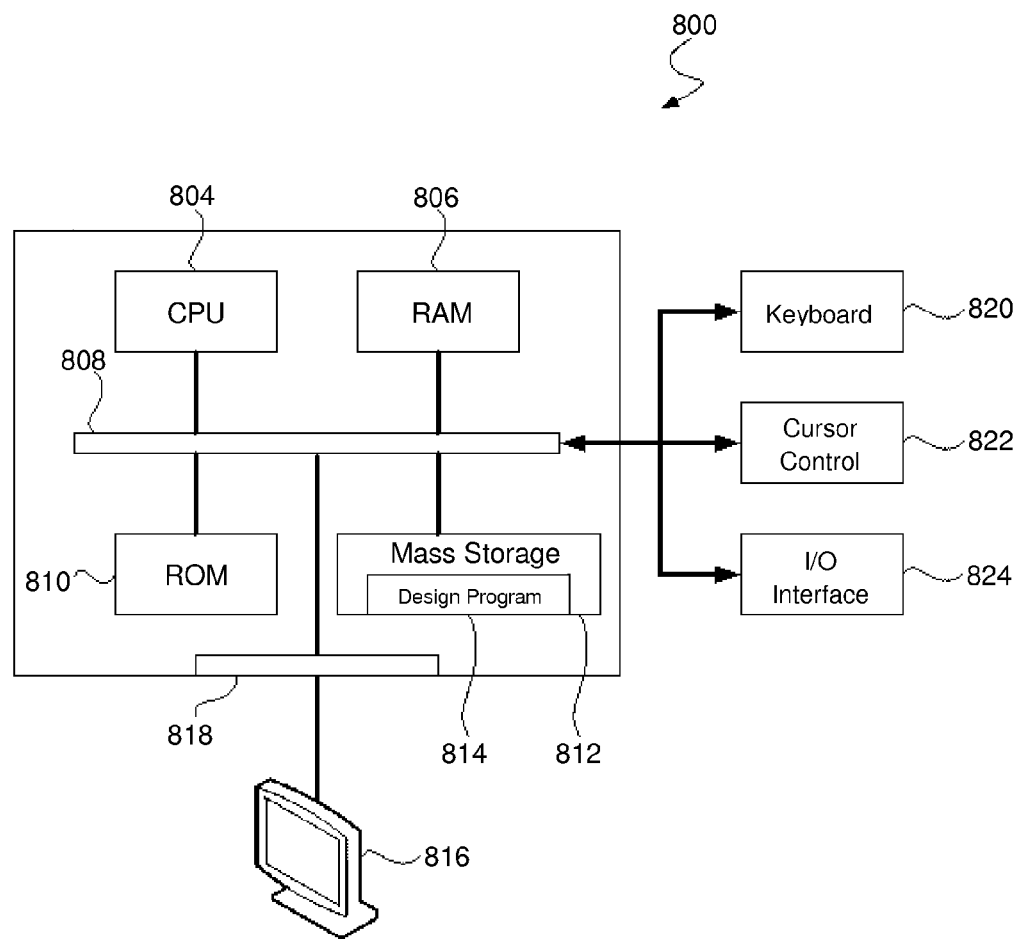
FIG. 8 is an exemplary schematic diagram of a computer system in accordance with one embodiment of the present invention.

FIG. 8 is an exemplary schematic diagram of a computer system 800 in accordance with one embodiment of the present invention. It should be appreciated that the methods described herein may be performed with a digital processing system, such as a conventional, general-purpose computer system. Special-purpose computers, which are designed or programmed to perform one function may be used in the alternative. The computer system includes a central processing unit (CPU) 804, which is coupled through bus 808 to random access memory (RAM) 806, read-only memory (ROM) 810, and mass storage 812. Mass storage device 812 represents a persistent data storage device such as a floppy disc drive or a fixed disc drive, which may be local or remote.

Referring still to FIG. 8, design program 814 resides in mass storage 812, but can also reside in RAM 806 during processing. According to one embodiment, design program 814 is an EDA tool, or a module of an EDA tool, that can perform any or all of the operations illustrated in FIGS. 1 and 2 and additional functionality described herein. It should be appreciated that CPU 804 may be embodied in a general-purpose processor, a special-purpose processor, or a specially programmed logic device. Display 816 is in communication with CPU 804, RAM 806, ROM 810, and mass storage device 812, through bus 808 and display interface 818. Keyboard 820, cursor control 822, and interface 824 are coupled to bus 808 to communicate information in command selections to CPU 804. It should be appreciated that data to and from external devices may be communicated through interface 824.

The embodiments, thus far, were described with respect to integrated circuits. The method and apparatus described herein may be incorporated into any suitable circuit. For example, the method and apparatus may be incorporated into numerous types of devices such as microprocessors or programmable logic devices. Exemplary programmable logic devices include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing exemplary embodiments has been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method of reassembling memory blocks in an IC, comprising:
identifying a virtual memory block in a first IC design to be reassembled;
identifying a plurality of logic circuitry and a plurality of memory blocks within of the virtual memory block, wherein the plurality of logic circuitry is operable to couple the plurality of memory blocks within the virtual memory block to form a custom memory block, wherein the custom memory block is functionally comparable to the plurality of memory blocks within the virtual memory block in the first IC design;
removing the plurality of logic circuitry and the plurality of memory blocks from the virtual memory block in the first IC design; and
replacing the virtual memory block with the custom memory block to generate a second IC design, and wherein at least one method operation is executed through a processor.

2. The method of claim 1, wherein the first IC design is implemented on a field programmable gate array (FPGA) device and the second IC design is implemented on a structured application specific integrated circuit (ASIC) device.

3. The method of claim 1, wherein the custom memory block has a plurality of input and output ports that correspond to respective input and output ports on the virtual memory block.

4. The method of claim 1, further comprising:
marking the plurality of logic circuitry within the virtual memory block before the removing operation.

5. The method of claim 4, wherein the marking includes inserting buffers at a boundary of the virtual memory block.

6. The method of claim 1, wherein the identifying the virtual memory block to be reassembled is based on at least one of a total number of memory bits used or a plurality of placement locations on the IC.

7. The method of claim 1, wherein the plurality of memory blocks in the virtual memory block to be reassembled are spaced apart from each other by a specified minimum distance.

8. The method of claim 1, further comprising:
comparing the second IC design with the first IC design; and
determining whether a functionality of the first IC design is preserved in the second IC design.

9. A method of optimizing an IC design, comprising:
generating a first netlist for the IC design;

identifying a plurality of memory blocks in the first netlist that are coupleable using a plurality of logic circuitry to form a single memory block;

placing a marker around a boundary of the plurality of memory blocks;

removing the plurality of logic circuitry based on the marking; and replacing the plurality of memory blocks with the single memory block, wherein a total number of input and output terminals of the single memory block is equivalent to a combined number of input and output terminals of each of the plurality of memory blocks, and wherein at least one method operation is executed through a processor.

10. The method of claim 9, wherein the plurality of memory blocks and the single memory block include a plurality of random access memory (RAM) blocks and a larger RAM block, respectively.

11. The method of claim 9, wherein the placing a marker around the boundary of the plurality of memory blocks includes placing a buffer at every input and output terminal of each of the plurality of memory blocks.

12. The method of claim 9, wherein the IC design is implemented on a programmable logic device (PLD) and wherein the replacing the plurality of memory blocks with the single memory block uses less space on the PLD.

13. The method of claim 9, further comprising:

generating a second netlist for the IC design after the replacing of the plurality of the memory blocks with the single memory block; and comparing the second netlist with the first netlist to determine whether a plurality of input and output terminals in the second netlist matches corresponding input and output terminals in the second netlist.

14. The method of claim 9, wherein the plurality of logic circuitry includes one of a plurality of logic gates, a plurality of storage elements or a plurality of selector circuits.

15. A machine-readable storage medium storing instructions thereon, that when executed by a processor implements a method, said method comprising:

generating a first netlist based on the IC design;

identifying a plurality of scattered memory blocks in the IC design to be reassembled;

selecting at least a portion of the plurality of scattered memory blocks to be reassembled into a larger memory block;

marking the portion of the plurality of scattered memory blocks to be reassembled;

removing a plurality of logic circuitry that connects each of the portion of the plurality of marked scattered memory blocks;

replacing the portion of the plurality of marked memory blocks with the larger memory block, wherein the larger memory block is functionally equivalent with the portion of the plurality of marked memory blocks;

generating a second netlist for the IC design with the larger memory block; and comparing the first netlist with the second netlist to determine whether a functionality of the first netlist is preserved in the second netlist.

16. The machine-readable storage medium of claim 15, wherein the selecting is based on one of a total number of memory blocks in the IC design or a type of the plurality of the scattered memory blocks.

17. The machine-readable storage medium of claim 15, wherein the first netlist is implemented on a first type of programmable logic device (PLD) and the second netlist is implemented on a second type of PLD.

18. The machine-readable storage medium of claim 17, wherein the second type of PLD is smaller in size compared to the first type of PLD.

19. The machine-readable storage medium of claim 15, wherein the marking comprises inserting buffers at a boundary of marked portion of the plurality of memory blocks.

20. The machine-readable storage medium of claim 19, wherein the buffers are placed at every input and output terminals of each of the plurality of marked memory blocks.

21. The machine-readable storage medium of claim 15, wherein the functionality of the first netlist is preserved in the second netlist if a number of bits and an operation mode of the plurality of marked memory blocks are retained in the larger memory block.

* * * * *